United States Patent [19]
Wu

[11] Patent Number: 5,872,840
[45] Date of Patent: Feb. 16, 1999

[54] ENHANCEMENT DO NOT DISTURB SUBSCRIBER FEATURE WITHIN A TELECOMMUNICATIONS NETWORK

[75] Inventor: Woody Wu, Plano, Tex.

[73] Assignee: Ericsson Inc., Research Triangle Park, N.C.

[21] Appl. No.: 822,286

[22] Filed: Mar. 19, 1997

[51] Int. Cl.⁶ .............................. H04M 3/00; H04M 1/66; H04M 3/42; H04M 7/00
[52] U.S. Cl. .......................... 379/197; 379/201; 379/207; 379/230
[58] Field of Search .................................. 379/188, 196, 379/197, 198, 199, 201, 207, 208, 219, 229, 230

[56] References Cited

U.S. PATENT DOCUMENTS

| | | | |
|---|---|---|---|
| 3,784,721 | 1/1974 | Kilby | 379/201 X |
| 3,793,487 | 2/1974 | Kilby | 379/201 X |
| 4,893,329 | 1/1990 | O'Brien | 379/373 X |
| 5,327,488 | 7/1994 | Garland | 379/201 |
| 5,357,564 | 10/1994 | Gupta et al. | 379/207 X |
| 5,495,521 | 2/1996 | Rangachar | 379/198 X |
| 5,524,145 | 6/1996 | Parker | 379/197 |

*Primary Examiner*—Harry S. Hong
*Attorney, Agent, or Firm*—Jenkens & Gilchrist

[57] ABSTRACT

An application module associated with a terminating telecommunication exchange serving a particular called party subscriber maintains data reflecting the number of call setups attempted by a calling party subscriber toward the restricted or barred called party subscriber. In case the number of call setups attempted by the calling party subscriber within a predefined time period reaches a certain threshold level, an incoming call connection is effectuated toward the otherwise restricted called party subscriber. As a result, even if the called party subscriber has a do not disturb (DND) call barring subscriber feature activated, emergency or urgent calls repeatedly made toward the called party subscriber are allowed to be terminated thereto.

22 Claims, 7 Drawing Sheets

ENHANCEMENT DO NOT DISTURB SUBSCRIBER FEATURE WITHIN A TELECOMMUNICATIONS NETWORK

BACKGROUND OF THE INVENTION

1. Technical Field of the Invention

The present invention relates to a subscriber feature within a telecommunications network, and in particular, to the provision of an enhanced do not disturb (DND) subscriber feature within such a network.

2. Description of Related Art

With developments and improvements in telecommunications networks, originating subscribers and terminating subscribers are able to instruct serving telecommunications networks or exchanges to provide user-specific subscriber features. Such a feature includes a do not disturb (DND) subscriber feature. By activating the DND subscriber feature, the associated telecommunications subscriber is able to block or deny incoming call connections. Furthermore, in order to selectively deny or block incoming call connections, the subscriber may further store a plurality of allowed and/or disallowed directory numbers within the serving telecommunications exchange. In response to a request for an incoming call connection, the serving telecommunications exchange then compares the calling party directory number (CgPn) associated with the received incoming call connection with the allowed and/or disallowed directory numbers and accordingly denies or effectuates the call connection.

Other terminating call treatments include call forwarding variable (CFV) where all or selected incoming calls are directly forwarded to a predefined forward-to-number; call forwarding busy (CFB) where all or selected incoming calls toward a busy called party subscriber are forwarded to a predefined forward-to-number; or anonymous call rejection (ACR) where an incoming call connection with a refusal to identify the associated calling party number to the called party subscriber is denied.

Figure 1:
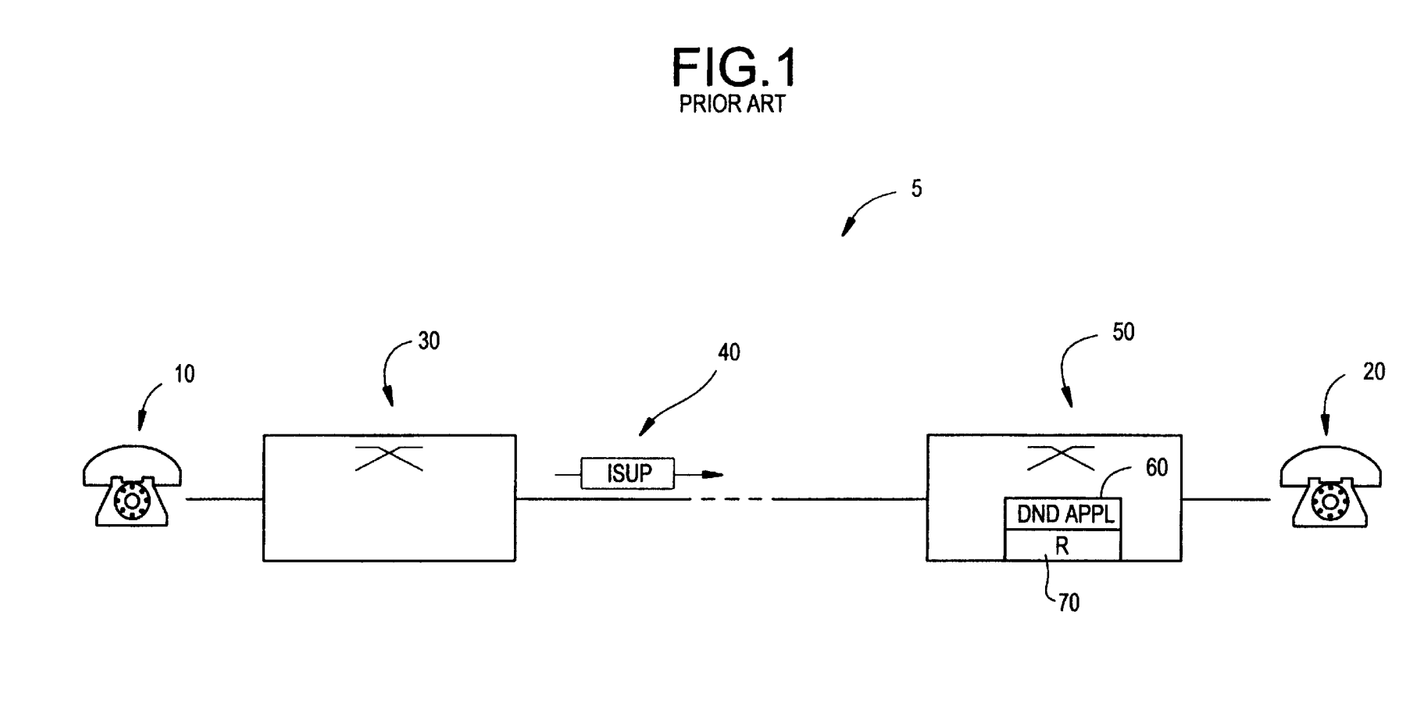
FIG. 1 (previously described) is a block diagram of a telecommunications network illustrating a call connection towards a subscriber with a do not disturb subscriber feature activated.

Reference is now made to FIG. 1 illustrating a telecommunications network 5 effectuating a call connection between a calling party subscriber and a called party subscriber in a conventional manner. The calling party subscriber 10 originates a call connection towards the called party subscriber 20 by dialing a directory number associated with the called party subscriber 20 (hereinafter referred to as a called party directory number—CdPn). An originating telecommunications exchange 30 detects the calling party subscriber's instructions, and transmits a call setup signal 40 towards a terminating telecommunications exchange 50 associated with the called party subscriber 20. Such a call setup signal may comprise an Integrated Service Digital Network User Part (ISUP) based signal, such as an Initial Address Message (IAM). The transmitted IAM signal 40 includes a calling party directory number (CgPn) representing the originating subscriber 10, a called party directory number (CdPn) representing the terminating subscriber 20, and a parameter specifying the calling party subscriber's private indicator. Such a private indicator instructs the terminating telecommunications exchange to display or not to display the associated calling party directory number to the terminating subscriber. As an illustration, in case the private indicator is set, a "Not Available" message is displayed on a Customer Premise Equipment (CPE, also known as a caller id display unit) attached to the called party subscriber terminal.

After receiving the incoming call connection request, the terminating telecommunications exchange 50 determines whether any one of the above described terminating subscriber features is currently activated for the called party subscriber. For example, the terminating telecommunications exchange 50 ascertains that the DND subscriber feature is currently activated for the called party subscriber 20. In case of a universal DND subscriber feature, an associated DND application module 60 rejects the incoming call connection by either generating a congestion / busy tone towards the calling party subscriber or by playing an announcement message thereto. In case of a selective DND subscriber feature, the DND application module 60 compares the calling party directory number (CgPn) included within the received IAM signal 40 with the allowed and/or disallowed directory numbers stored at a register 70 to determine whether to allow or deny the received incoming call connection.

Furthermore, in order to enable a calling party subscriber to override or by-pass the above described terminating call treatment subscriber features, a number of additional subscriber features or functions are also available. For example, a particular subscriber defines a service code or access code within the serving telecommunications exchange. A calling party subscriber may then override the activated terminating call treatment or call barring subscriber feature by providing the necessary service code or access code and establish a call connection with the otherwise restricted called party subscriber. As an illustration, in case the calling party subscriber's incoming call connection request is initially denied by the DND application module associated with the terminating exchange, the terminating exchange may further instruct the calling party subscriber to provide the necessary access code. Upon entering the requested access code via DTMF, for example, the terminating exchange then overrides the terminating call treatment and effectuates a call connection therebetween.

However, such a solution requires the subscriber to inconveniently communicate such an access code to all of his or her friends, associates, and the like. Furthermore, in case a person without access to the access code desires to urgently establish a call connection with the called party subscriber, the above mechanism provides no solution.

Accordingly, there is a need for a mechanism to enable a calling party subscriber to override an existing terminating call treatment subscriber feature without providing additional called party subscriber associated data or information to a terminating telecommunications exchange serving the called party subscriber.

SUMMARY OF THE INVENTION

An apparatus and method for establishing a call connection between a calling party subscriber and a called party subscriber is disclosed. The called party subscriber has a subscriber feature activated within the serving telecommunications exchange for barring or denying incoming call connections from the calling party subscriber. The serving telecommunications exchange further maintains data specifying the number of incoming call setups attempted by the calling party subscriber towards the called party subscriber. If the number of call setups attempted by the calling party subscriber reaches a threshold level associated with the serving telecommunications exchange, an otherwise restricted incoming call connection request toward the called party subscriber is allowed and a call connection is effectuated between the calling party subscriber and the called party subscriber.

In one embodiment of the present invention, for each incoming call connection from a particular calling party subscriber, the number of call setups previously attempted by the calling party subscriber within a predefined time period is determined. In case the determined number reaches the threshold number, the respective incoming call connection is allowed to be terminated toward the called party subscriber.

In another embodiment of the present invention, the called party subscriber is informed of the incoming call connection overriding the DND subscriber feature before the speech connection with the associated calling party subscriber established thereto.

In yet another embodiment of the present invention, after being informed of the incoming call connection, the called party subscriber has an option to provide a call treatment instruction to the serving telecommunications exchange regarding the received incoming call connection. Accordingly, the called party subscriber can instruct the serving telecommunications exchange to reroute the received incoming call connection to a forward-to-number or voice-mail even after the number of call setups attempted have exceeded the imposed threshold level.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 2:
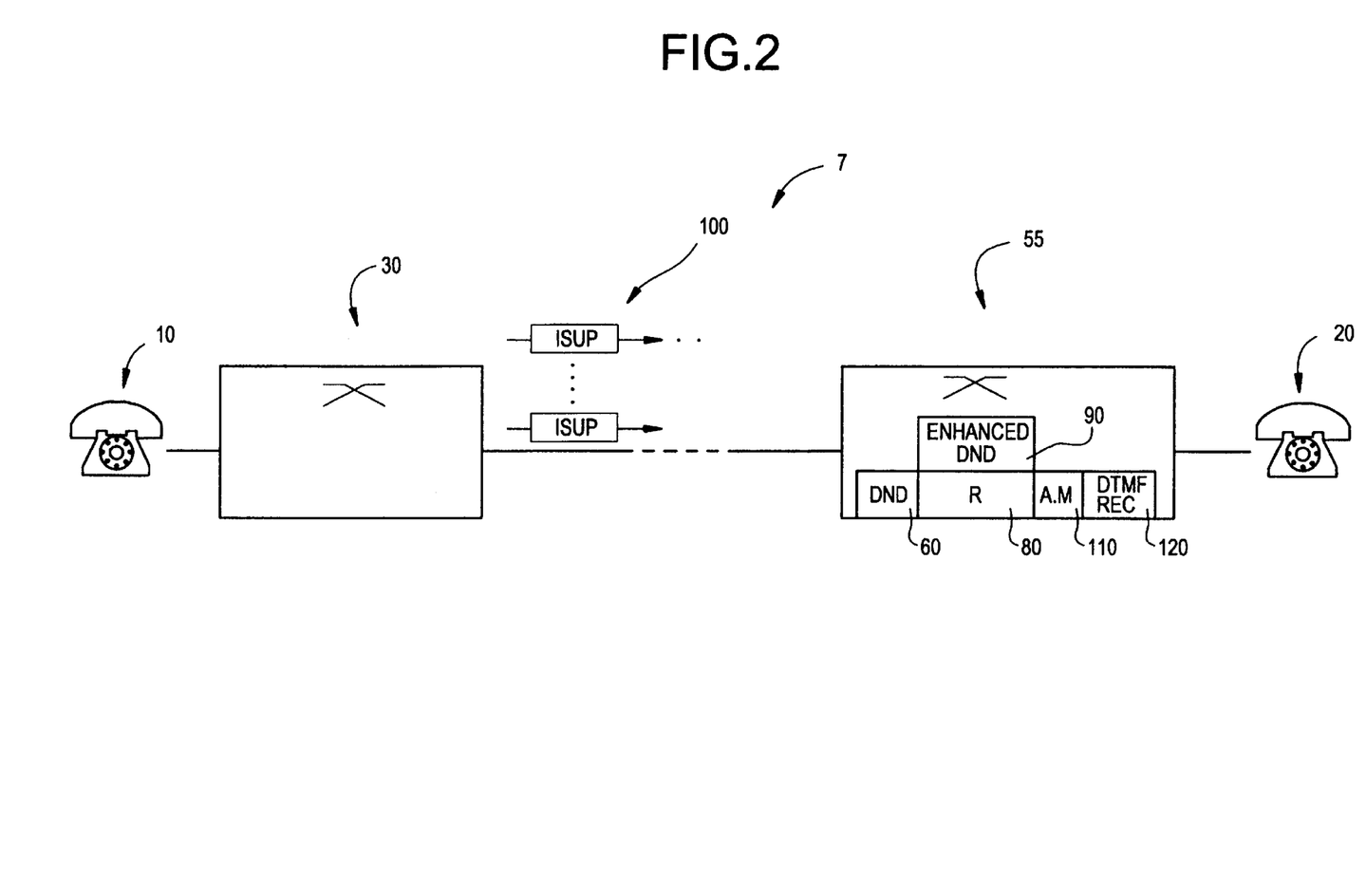
FIG. 2 is a block diagram of a telecommunications network illustrating a call connection in accordance with the teachings of the present invention.

FIG. 2 is a block diagram of a telecommunications network 7 illustrating a call connection between a calling party subscriber and a called party subscriber in accordance with the teachings of the present invention. The called party subscriber 20 has a do not disturb (DND) subscriber feature activated. An associated DND application module 60 thereafter rejects all incoming call connections attempted towards the called party subscriber. As an illustration, the calling party subscriber 10 and associated originating telecommunications exchange 30 transmit a call setup signal, such as an Initial Address Message (IAM) 100, towards the terminating telecommunications exchange 55. The DND application module 60 receives the transmitted IAM signal 100 and determines that the call setup is being requested towards the restricted called party subscriber 20. The DND application module then rejects the incoming call connection by either generating a congestion/busy tone or playing an appropriate announcement message towards the calling party subscriber.

It is in connection with this DND subscriber feature that the preferred embodiments of the present invention will be described. However, as the system and method of the present invention are applicable with any terminating call treatment or call barring subscriber features within a telecommunications network, it will be understood that the description of the present invention in the context of the DND subscriber feature provided herein is by way of explanation of the present invention rather than of limitation of the scope of the invention.

In accordance with the teachings of the present invention, an enhanced DND application module 90 is introduced into the terminating telecommunications exchange 55 serving the called party subscriber 20. Each time an incoming call connection is attempted by the calling party subscriber 10, the enhanced DND application module 90 updates data representing the number of call setups attempted by the calling party subscriber 10 toward the called party subscriber 20. Such data are stored at a register (R) 80 associated with the terminating telecommunications exchange 55. As each subsequent incoming call connection is received by the terminating telecommunications exchange 55, the enhanced DND application module 90 determines whether the total number of call setups attempted by the calling party subscriber has reached a threshold level predefined within the terminating telecommunications exchange 55. A further determination may be made to ascertain whether the total number of call setups attempted by the calling party subscriber within a predefined time period has reached the threshold level. For example, the enhanced application module determines whether the number of previously attempted call setups has reached a numerical value of five (5) within the last sixty (60) minute time period. In response to an affirmative determination, the enhanced DND application module 90 then accepts the incoming call connection and effectuates a call connection between the calling party subscriber 10 and the otherwise restricted called party subscriber 20.

Before effectuating a voice connection with the called party subscriber 20, the enhanced DND application module 90 may alert the called party subscriber of the incoming call connection overriding the activated DND subscriber feature. As an illustration, the enhanced DND application module 90 may play an announcement message informing the called party subscriber of an incoming call connection overriding the DND subscriber feature via an announcement machine (AM) 110. The enhanced DND application module 90 may also transmit the associated calling party directory number (CgPn) toward a customer premise equipment (CPE, or more commonly known as a caller id display unit) attached to the called party subscriber terminal. As an alternative, using a voice synthesizer, the enhanced DND application module 90 may also provide the called party subscriber with a synthesized voice indicative of the calling party subscriber directory number or, if available, subscriber name.

After receiving such an indication from the enhanced DND application module, the called party subscriber 20 may then provide a routing instruction regarding the received incoming call connection toward the serving telecommunications exchange. For example, the announcement message states "an incoming call connection is repeatedly received from Mr. Smith (or 214-123-1245), if you wish to answer, press 1; to forward it to your voicemail, press 2; or to reject the call connection, press 3." The called party subscriber then, for example, enters a desired dual tone multi-frequency (DTMF) signal. The enhanced DND application module 90 then recognizes the entered DTMF signal via an associated DTMF recognizer (also known as a code receiver) 120 and accordingly provides the instructed call treatment towards the incoming call connection received from the calling party subscriber 10.

Figure 3:
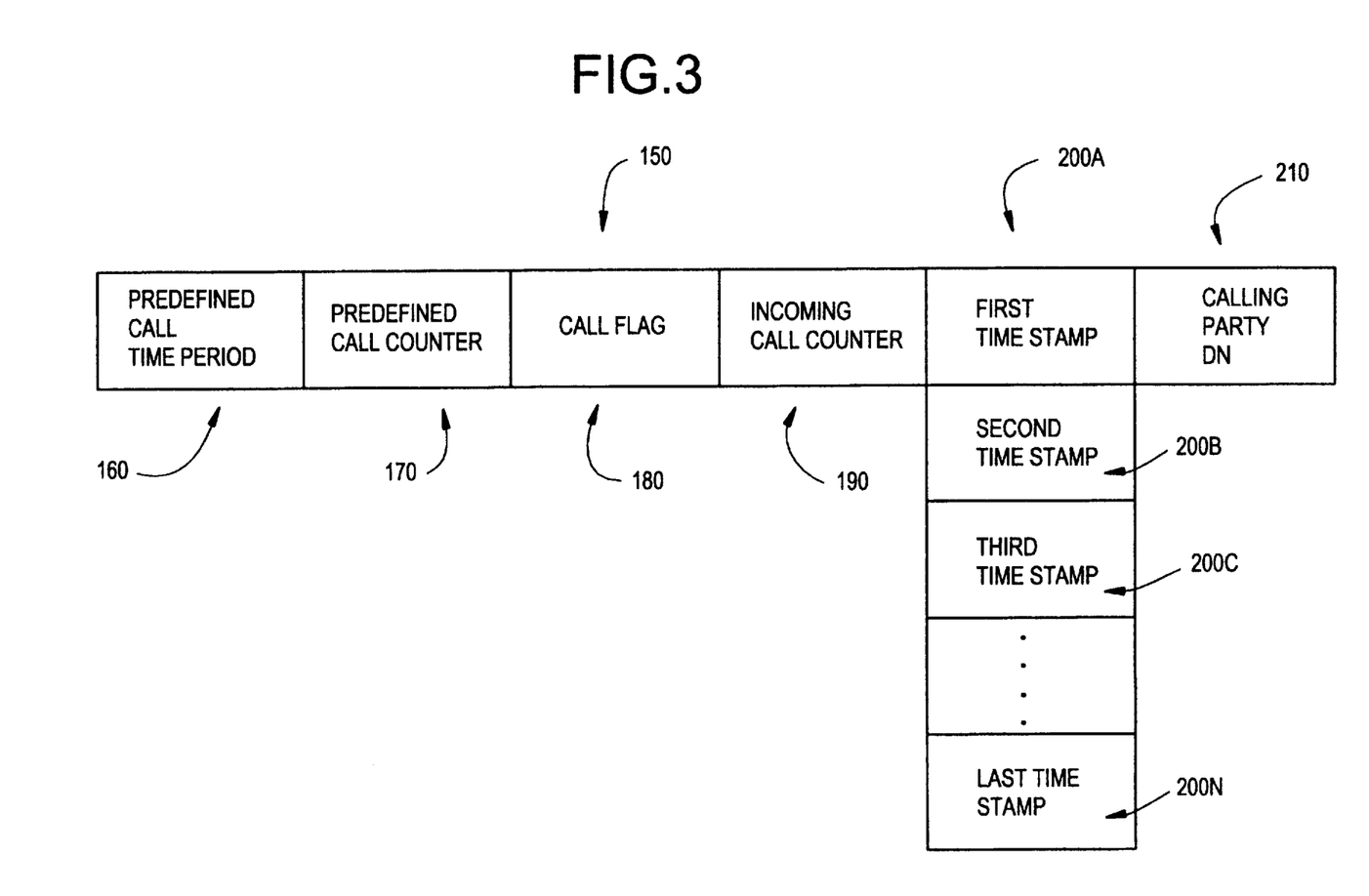
FIG. 3 is a diagram of a data structure associated with a terminating telecommunications exchange for maintaining data indicative of the number of call setups attempted by a particular calling party subscriber towards a particular called party subscriber.

FIG. 3 is a block diagram of a data structure 150 associated with a terminating telecommunications exchange for maintaining data indicative of the number of call setups attempted by a particular calling party subscriber towards a particular called party subscriber. A data record formatted in accordance with the illustrated data structure is stored at a register, such as a random access memory (RAM), associated with the terminating telecommunications exchange.

A predefined call time period field 160 within a data record structured in accordance with the data structure 150 specifies a period or time duration during which a predefined number of call attempts have to be received from the calling party subscriber towards the called party subscriber. As an illustration, the predefined call time period field 160 specifies a duration of sixty (60) minutes.

A predefined call counter field 170 specifies the number of incoming call setups by the calling party subscriber required by the terminating telecommunications exchange before an incoming call connection is allowed to be terminated towards the called party subscriber. As an illustration, the predefined call counter specifies a numerical value of three (3). Accordingly, in conjunction with the predefined call time period field 160, a total of three call setups must be attempted by the calling party subscriber within a sixty minute time period to effectuate a call connection with the called party subscriber.

A call flag field 180 represents whether the number of call setups attempted by the calling party subscriber toward the called party subscriber has reached the predefined call counter value. If the call flag field 180 is set, an incoming call connection from the calling party subscriber to the called party subscriber is effectuated.

An incoming call counter field 190 indicates the number of call setups previously attempted by the calling party subscriber towards the called party subscriber. Accordingly, the value of the incoming call counter 190 is incremented by one for each incoming call connection attempted by the calling party subscriber toward the called party subscriber.

An array of time stamp fields 200 specify the time associated with each of the call setups attempted by the calling party subscriber towards the called party subscriber. As an illustration, a first time stamp field 200A specifies the time associated with the first call setup attempted by the calling party subscriber. Similarly, a second time stamp field 200B specifies the time associated with the second call setup attempted by the calling party subscriber.

Lastly, a calling party directory number field 210 stores the directory number associated with the calling party subscriber. Accordingly, each time an incoming call connection is received by the serving telecommunications exchange, the enhanced DND application module indexes the calling party directory number field to identify and to locate the appropriate data record 150 for storing and updating the associated data.

The predefined parameters or fields as described above may be updated by the serving network operator or may be updated by a subscriber, for example, via DTMF signals and interactive announcement messages.

Figure 4:
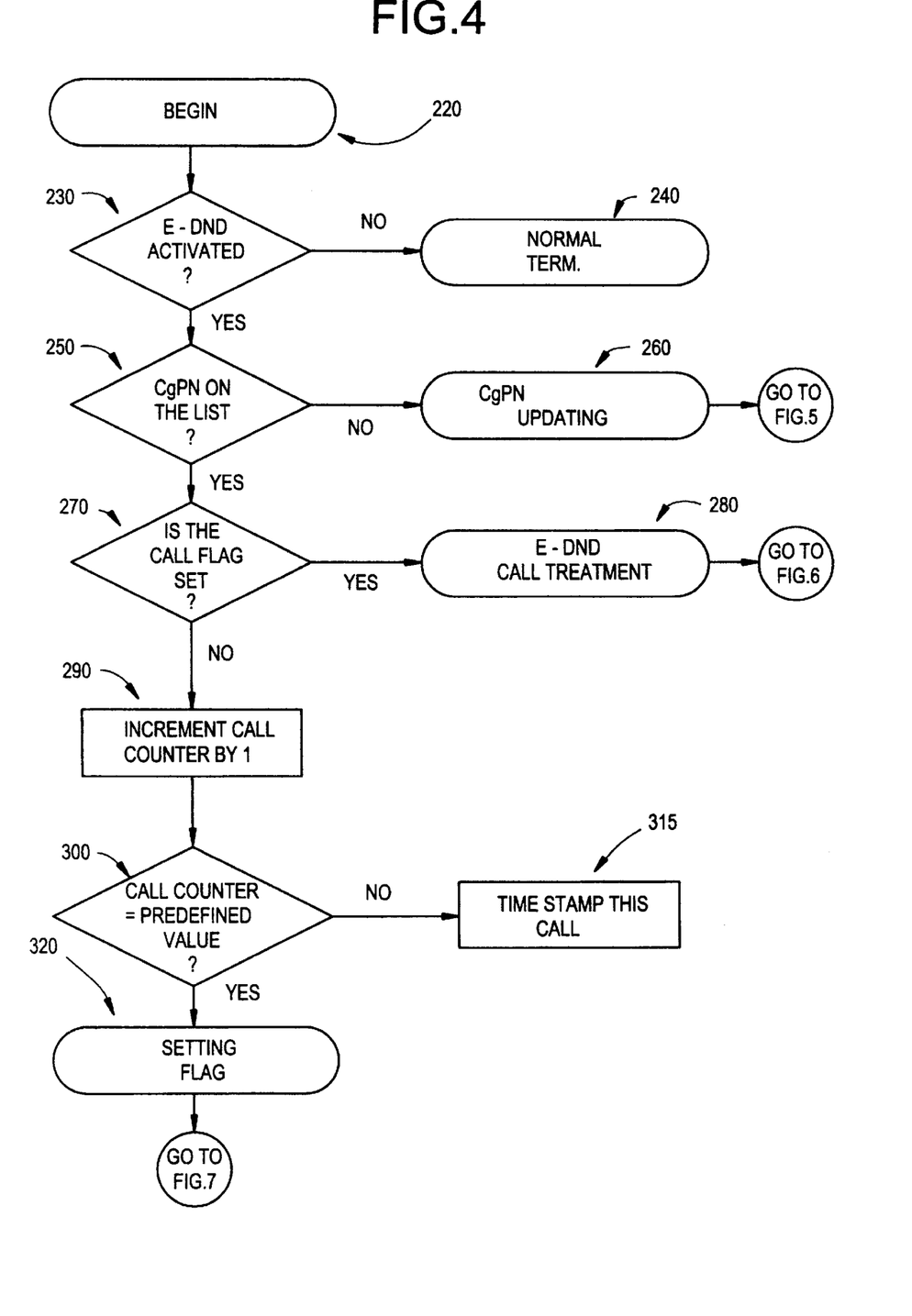
FIG. 4 is a flowchart illustrating the steps performed by a main task associated with an enhanced-do-not-disturb (DND) application module.

FIG. 4 is a flowchart illustrating the steps performed by a main task associated with an enhanced-do-not-disturb (DND) application module in accordance with the teachings of the present invention. The enhanced DND application module is invoked at step 220 when an incoming call connection is received towards a restricted or barred called party subscriber. Accordingly, the incoming call connection has already been rejected or barred by a subscriber feature as described in FIG. 1. The enhanced application module then determines whether the called party subscriber has activated the enhanced DND subscriber feature at step 230. In response to a negative determination (decision link No), the enhanced DND allows the incoming call connection to be rejected in a conventional manner as described in FIG. 1 at step 240. However, in response to an affirmative determination (decision link Yes), the enhanced DND application module determines whether the calling party directory number (CgPn) associated with the received call setup request is already registered with an associated data record at step 250.

Figure 5:
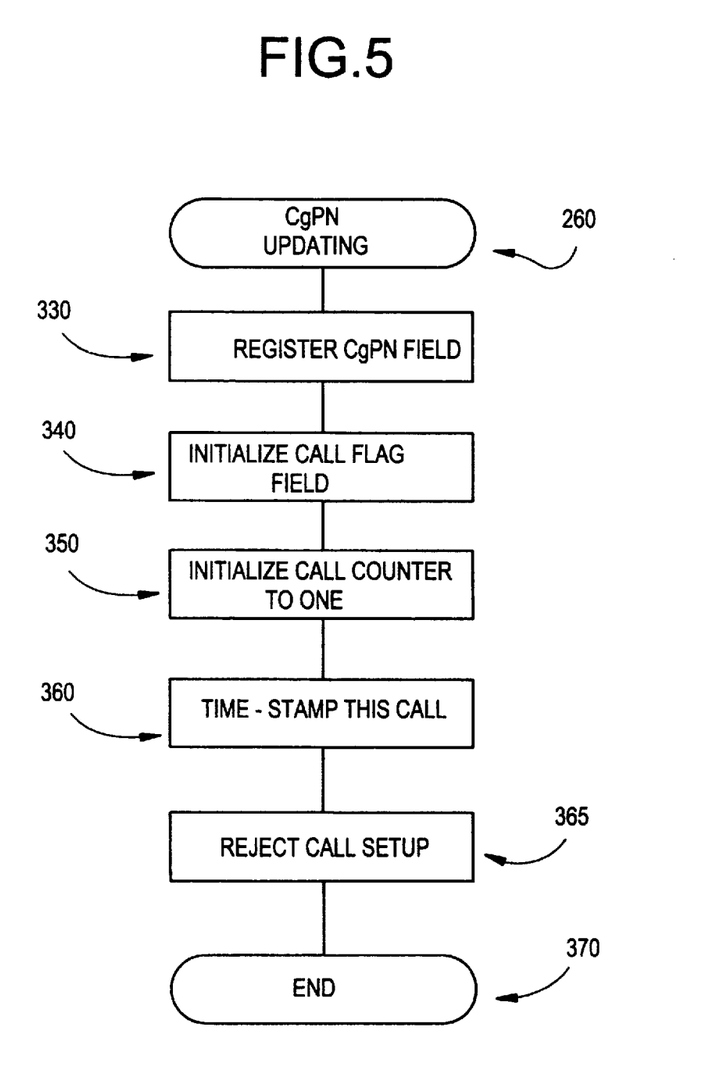
FIG. 5 is a flowchart illustrating the steps performed by the DND application module for registering a new calling party number within a serving telecommunications exchange.

In case the calling party number is not already registered (decision link No), this is the first time the calling party subscriber is attempting an incoming call connection toward the called party subscriber, and the enhanced DND application module registers the newly received calling party number at step 260. Reference is now made to FIG. 5 illustrating the steps performed by the enhanced DND application module (step 260) to register a new calling party directory number. The enhanced DND application module stores the received calling party directory number at the calling party directory number field of a new data record as described above in FIG. 3 at step 330. The application module then further initializes the call flag field to be false at step 340 and the call counter field to be one (1) at step 350. In order to further register this particular incoming call setup attempt, the time of such a call setup attempt is stored at the first time stamp field of the newly created data record at step 360. Since this is the first call setup attempted by the calling party subscriber, the requested call connection is accordingly rejected at step 365. The application module then terminates at step 370.

Referring back to FIG. 4, in case the calling party number is already registered with the enhanced DND application module at step 250 (decision link Yes), the application module determines whether the call flag field associated with the data record representing the calling party subscriber is set at step 270. In response to an affirmative determination that the call flag field is set to true (decision link yes), an enhanced call treatment is provided at step 280. Accordingly, if the call flag field is set, the previously attempted number of call setups by the calling party subscriber has reached the predefined threshold level and the call connection is allowed to be terminated toward the repeatedly called subscriber.

Figure 6:
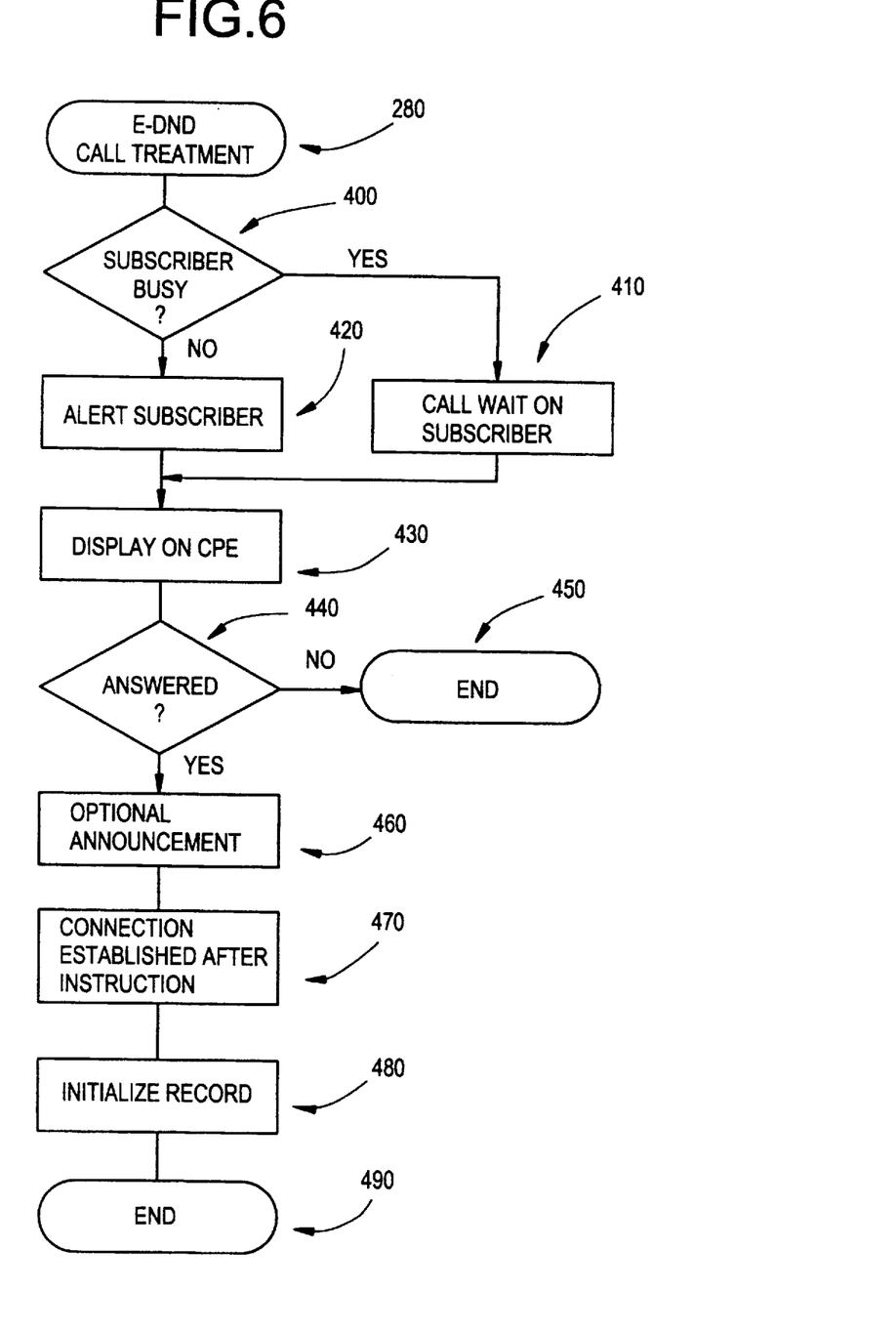
FIG. 6 is a flowchart illustrating the steps performed by the DND application module for establishing a call connection between a calling party subscriber and a called party subscriber.

Reference is now made to FIG. 6 illustrating the steps performed by the enhanced DND application module in step 280 to provide the enhanced call treatment in accordance with the teachings of the present invention. The application module first determines whether the called party subscriber is busy at step 400. If the called party subscriber is busy (decision link Yes), an intrusion tone, such as a call waiting tone or distinctive tone, is generated on an existing call connection to inform the called party subscriber of call waiting at step 410. Otherwise, the called party subscriber is alerted in a conventional manner (ringing signal) at step 420. Such a signal further includes a distinctive ringing or short ringing to inform the called party subscriber of an enhanced DND subscriber feature associated incoming call connection. If the called party subscriber is equipped with a customer premise equipment (CPE), such as a caller id display unit, the calling party number is further displayed thereto at step 430. If the called party subscriber answers the call at step 440, an optional announcement message informing the called party subscriber of an incoming call connection overriding the activated DND subscriber feature can be played at step 460. The application module may then receive a further instruction from the called party subscriber regarding the received incoming call connection at step 460. Such an instruction may instruct the terminating telecommunication exchange to still reject the incoming call connection, accept the call connection, forward the call connection to voicemail, etc. After providing the instructed call treatment towards the received incoming call connection, the data record associated with the calling party subscriber is accordingly initialized at step 480. All time-stamp fields are deleted, the call flag field is reset, the call counter field is initialized with a value of zero (0), and the calling party directory number is removed from the associated data record. The call processing then ends at step 490.

On the other hand, if the called party subscriber does not answer at step 440, the call processing ends at step 450 without initializing the associated data record. Since the call flag field is already set for this particular calling party subscriber, a subsequently received incoming call setup request from the same calling party subscriber will be allowed to terminate directly toward the called party subscriber without performing further determinations (Refer to FIG. 4, Steps 270 and 280).

Reference is now made back to FIG. 4 for the case where the associated call flag is not yet set. Accordingly, the number of call setups attempted by the calling party subscriber towards the called party subscriber has not yet reached the required threshold level. The application module therefore increments the value of the call counter field by one at step 290. The application module then determines whether the incremented call counter has reached the required threshold level at step 300. In case the value of the call counter is still below the imposed threshold value, the application module time-stamps this particular call setup request by updating the appropriate time-stamp field of the associated data record at step 315. On the other hand, if the incremented call counter has reached the imposed threshold level, the call flag field is accordingly set to true at step 320.

Figure 7:
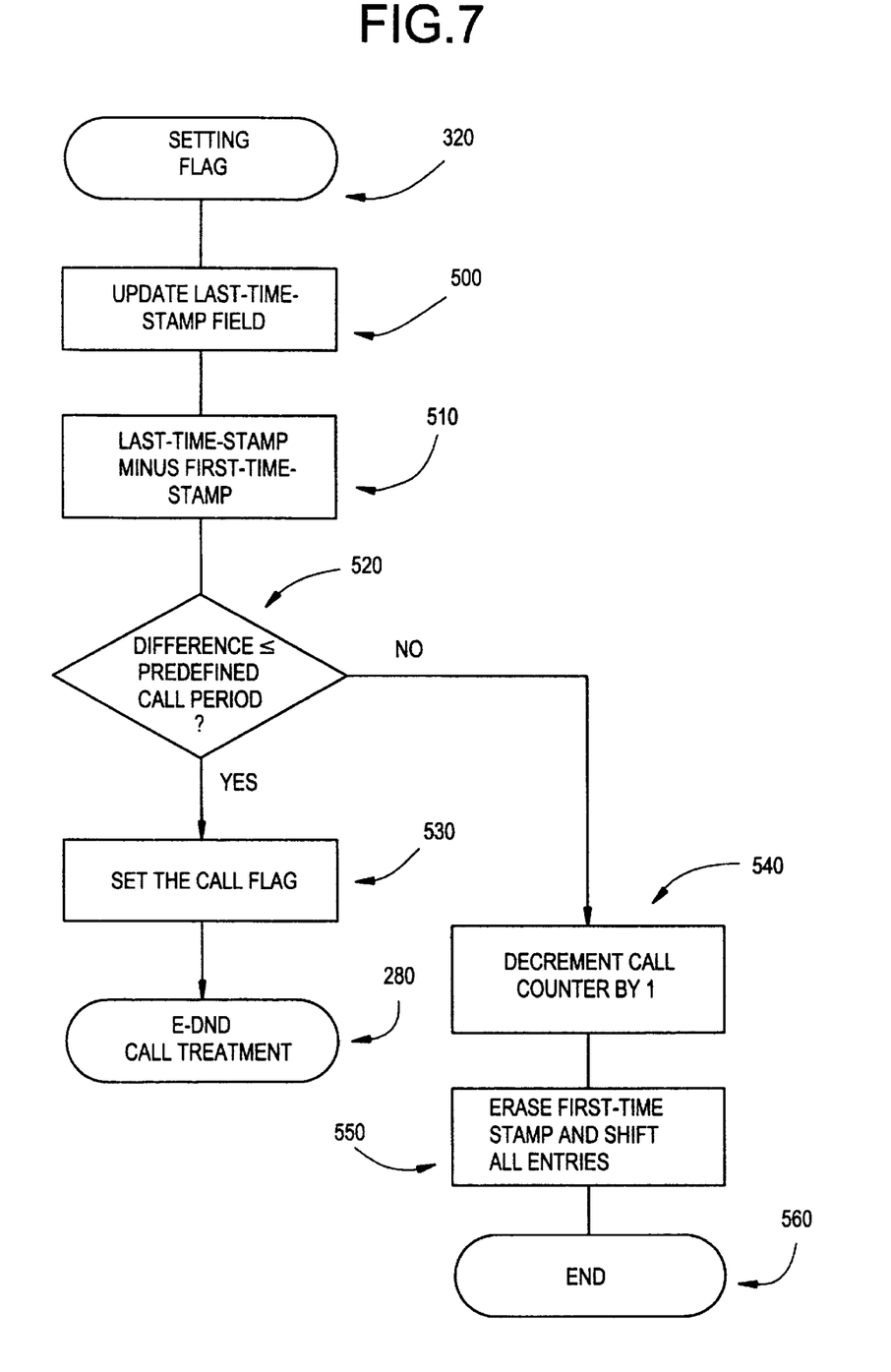
FIG. 7 is a flowchart illustrating the steps for determining whether the number of call setups attempted by a particular calling party subscriber has reached a threshold level in accordance with the teachings of the present invention.

Reference is now made to FIG. 7 illustrating the steps performed by the enhanced DND application module for setting the call flag field in accordance with the teachings of the present invention. The last time-stamp field of the associated data record is updated with the time representing the lastly received incoming call connection at step 500. The value from the first time-stamp field is then subtracted from the last time-stamp field to ascertain the total duration time covering the first call setup request to the last call setup request attempted by the calling party subscriber at step 510. The determined difference is then evaluated against the predefined call time period imposed on the enhanced DND application module at step 520. For exemplary purposes, predefined call time period and predefined call counter are shown associated with each data record at FIG. 3. However, it is to be understood that such values can also be easily stored within a global variable or register and utilized by all associated data records.

If the determined duration or time between the first received call setup request and the last received call setup request is within the imposed predefined call period (decision link Yes), the associated call flag field is set at step 530. The enhanced DND call treatment as previously described in FIG. 6 is then provided to the received incoming call connection at step 280. On the other hand, if the determined time difference is greater than the predefined call period (decision link No), the total time duration between the firstly received call setup request and the lastly received call setup request has exceeded the imposed time period. As an illustration, in order to override the call barring or do not disturb (DND) call treatment placed on the called party subscriber, in accordance with the enhanced DND subscriber feature, the calling party subscriber has to repeatedly attempt three separate call setups towards the called party subscriber within a sixty (60) minute time period. Therefore, if the determined time difference between the first attempt and the third attempt exceeds the predefined time period, the requested incoming call connection can be effectuated towards the called party subscriber.

As a result, in response to a determination that the requisite number of calls have exceeded the imposed time period, the enhanced DND application module decrements the call counter by one (1) at step 540. The first time-stamp field associated with the data record is further initialized to remove the stored data at step 550. The rest of the time-stamp fields are then shifted forward by one field. As an illustration, the time data stored in the second time-stamp field replaces the first time-stamp field. The third time-stamp field similarly replaces the second time-stamp field. A method or mechanism for shifting data between different indexes of an array is already well known within relevant art and will not be discussed in detail herein.

Accordingly, a call setup request with a time older than the predefined time period is removed from the associated data record at step 550. The enhanced DND application module then completes the function at step 560 and awaits for the next call connection request towards the called party subscriber from the calling party subscriber.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for establishing a call connection between a calling party subscriber and a called party subscriber, said method comprising the steps of:

receiving a call setup message at a telecommunications exchange associated with said called party subscriber, said call setup message originated from said calling party subscriber towards said called party subscriber;

determining that a call connection towards said called party subscriber is restricted;

determining a number of call setups previously attempted by said calling party subscriber towards said called party subscriber;

comparing said determined number of call setups with a predefined threshold value; and if said determined number equals said threshold value, establishing a call connection between sad calling party subscriber and said called party subscriber;

otherwise,
rejecting said call setup message.

2. The method of claim 1 wherein said step of determining that said call connection toward said called party subscriber is restricted further comprises the steps of:
   determining whether a calling party directory number (CgPn) associated with said calling party subscriber is stored at a register and associated with said called party subscriber; and
   if no,
      storing said CgPn into an entry at said register; and
      initializing a call counter associated with said calling party subscriber, said call counter indicating the number of call setups attempted by said calling party subscriber;
   otherwise,
      performing said step of determining the number of call setups attempted by said calling party subscriber.

3. The method of claim 2 wherein said step of storing said CgPn at said register further comprises the step of time-stamping said entry at said register.

4. The method of claim 1 wherein said step of rejecting said call setup message further comprises the step of incrementing a call counter associated with said calling party subscriber, said call counter indicating the number of calls attempted by said calling party subscriber.

5. The method of claim 4 wherein said step of incrementing said call counter further comprises the step of time-stamping said step of incrementing.

6. The method of claim 1 wherein said step of establishing said call connection between said calling party subscriber and said called party subscriber further comprises the steps of:
   alerting a called party terminal associated with said called party subscriber;
   informing said called party subscriber of said received call setup request; and
   establishing said call connection.

7. The method of claim 6 further comprises the steps of:
   receiving a further instruction from said called party regarding the received call setup message; and
   terminating said call connection in accordance with said received instruction.

8. The method of claim 1 wherein said step of determining said number of call setups previously attempted by said calling party subscriber further comprises the step of determining the number of call setups previously attempted by said calling party subscriber during a predefined time period.

9. The method of claim 1 wherein said call connection is initially restricted by a do not disturb (DND) subscriber feature.

10. A system for establishing a call connection between a calling party subscriber and a called party subscriber within a telecommunications network, said system comprising:
    a switch for receiving a plurality of call setup requests, each of said call setup request including a called party directory number (CdPn) addressed to said called party subscriber and a calling party directory number (CgPn) identifying said calling party subscriber;
    a register for storing said CgPn and associated with said called party subscriber, said register further comprising:
       a plurality of time-stamp fields for storing time for each of said call setups attempted by said calling party subscriber towards said called party subscriber; and
       a call counter field for indicating the number of call setups attempted by said calling party subscriber; and
    an application module associated with said switch for:
       updating said time-stamp fields and said call counter field each time a particular one of said plurality of call setup requests is received by said switch; and
       establishing a call connection between said calling party subscriber and said called party subscriber if said call counter for said calling party subscriber has reached a predefined threshold number imposed on said application module.

11. The system of claim 10 wherein said register further stores a predefined time period wherein said application module establishes a call connection between said calling party subscriber and said called party subscriber in case said calling party subscriber has attempted said threshold number of call setup attempts within said predefined time period.

12. The system of claim 11 further comprising means for removing contents of a time-stamp field older than said predefined time period.

13. The system of claim 11 wherein said application module further comprises:
    means for alerting said called party subscriber of an incoming call connection;
    means for receiving an instruction from said called party subscriber regarding said incoming call connection; and
    means for providing a terminating call treatment in accordance with said received instruction.

14. The system of claim 13 wherein said step of receiving an instruction further comprise means for informing said called party subscriber of said calling party number.

15. The system of claim 13 wherein said provided terminating call treatment includes generating a congestion tone towards said calling party subscriber.

16. A method for screening incoming call connections towards a particular called party subscriber within a telecommunications network, said incoming call connections initially restricted by a subscriber feature associated with said called party subscriber, said method comprising the steps of:
    receiving a plurality of call setup requests from a particular calling party subscriber, said plurality of call setup requests sequentially received at different times;
    maintaining, for each of said plurality of call setup requests, data indicating the number of call setup requests previously attempted by said calling party subscriber;
    determining whether said maintained number is less than a predefined threshold number imposed on said telecommunications network; and
    if no,
       rejecting said call setup request from said calling party subscriber;
    otherwise,
       establishing a call connection between said calling party subscriber and said called party subscriber.

17. The method of claim 16 wherein said step of maintaining said data further comprises the step of maintaining data specifying a received time associated with each of said plurality of call setup requests.

18. The method of claim 17 wherein said step of determining whether said maintained number is less than said predefined threshold number further comprises the step of determining whether said received times associated with said maintained number of call setup requests are received during a predefined time period imposed on said telecommunications network.

19. The method of claim 16 wherein said step of establishing said call connection further comprises the steps of:

alerting a terminating subscriber terminal associated with said called party subscriber;

informing said called party subscriber of said received call setup request; and establishing said call connection.

20. The method of claim 19 wherein said step of informing said called party subscriber further comprises the step of informing said called party subscriber of said calling party directory number (CgPn).

21. The method of claim 19 wherein said step of informing said called party subscriber further comprises the steps of:

receiving a routing instruction from said called party subscriber regarding said received call setup request; and providing terminating treatment in accordance with said received routing instruction.

22. The method of claim 16 wherein said incoming call connections are initially restricted by a do not disturb (DND) subscriber feature associated with said called party subscriber.

\* \* \* \* \*

UNITED STATES PATENT AND TRADEMARK OFFICE
CERTIFICATE OF CORRRECTION

PATENT NO. : 5,872,840         Page 1 of 2
DATED : February 16, 1999
INVENTOR(S) : Woody Wu It is certified that error appears in the above-identified patent and that said Letters Patent is hereby corrected as shown below:

On the title page, under item [56] insert the following:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | 5 | 0 | 0 | 3 | 5 | 9 | 5 | 3/26/91 | Collins et al. | | | |
| | | 5 | 5 | 0 | 9 | 0 | 5 | 5 | 4/16/96 | Ehrlich et al. | | | |

FOREIGN PATENT DOCUMENTS

| | | DOCUMENT NUMBER | | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|---|
| | | 0 | 2 | 0 | 5 | 6 | 1 | 54 | 2/26/90 | Japan (abstract only) | | | | |
| | | WO 95/ | 1 | 2 | 9 | 4 | 8 | | 5/11/95 | PCT | | | | |

UNITED STATES PATENT AND TRADEMARK OFFICE
CERTIFICATE OF CORRRECTION

PATENT NO. : 5,872,840
DATED : February 16, 1999
INVENTOR(S) : Woody Wu It is certified that error appears in the above-identified patent and that said Letters Patent is hereby corrected as shown below:

OTHER DOCUMENTS

| | |
|---|---|
| | PCT Search Report, July 9, 1998, PCT/US 98/05274 |
| | |

Signed and Sealed this

Twenty-seventh Day of April, 1999

*Attest:*

Q. TODD DICKINSON

*Attesting Officer*     *Acting Commissioner of Patents and Trademarks*

UNITED STATES PATENT AND TRADEMARK OFFICE
CERTIFICATE OF CORRECTION

PATENT NO. : 5,872,840
DATED : Feb. 16, 1999
INVENTOR(S) : Wu

It is certified that error appears in the above-identified patent and that said Letters Patent is hereby corrected as shown below:

Column 8, line 66    Replace "sad"
                     With --said--

Signed and Sealed this

Eighth Day of June, 1999

Attest:

Attesting Officer

Q. TODD DICKINSON

Acting Commissioner of Patents and Trademarks